United States Patent [19]
Korbel

[11] Patent Number: 5,093,595
[45] Date of Patent: Mar. 3, 1992

[54] SPINDLE MOTOR HAVING REDUCED TORQUE RIPPLE

[75] Inventor: Garry E. Korbel, New Prague, Minn.

[73] Assignee: Magnetic Peripherals Inc., Minneapolis, Minn.

[21] Appl. No.: 693,048

[22] Filed: Apr. 29, 1991

Related U.S. Application Data

[63] Continuation of Ser. No. 452,625, Dec. 15, 1989, abandoned.

[51] Int. Cl.$^5$ .............. H02K 21/12; H02K 7/00; H01F 7/02
[52] U.S. Cl. .................. 310/156; 310/67 R; 335/302
[58] Field of Search ............ 310/67 R, 156, 268, 310/51; 335/296, 302; 360/98.07, 99.04, 99.08

[56] References Cited

U.S. PATENT DOCUMENTS

| | | | |
|---|---|---|---|
| 4,110,718 | 8/1978 | Odor et al. | 335/296 |
| 4,217,508 | 8/1980 | Uzuka | 310/156 |
| 4,417,167 | 11/1983 | Ishii et al. | 310/156 |
| 4,438,362 | 3/1984 | Brown | 310/156 |
| 4,574,211 | 3/1986 | Muller et al. | 310/156 |
| 4,698,542 | 10/1987 | Muller | 310/67 R |
| 4,760,298 | 7/1988 | Kitahara et al. | 310/67 R |
| 4,814,652 | 3/1989 | Wright | 310/67 R |
| 4,847,712 | 7/1989 | Crapo | 360/99.08 |
| 4,918,346 | 4/1990 | Tajima et al. | 310/156 |

Primary Examiner—Steven L. Stephan
Assistant Examiner—C. LaBalle
Attorney, Agent, or Firm—Frederick W. Niebuhr; Edward P. Heller, III

[57] ABSTRACT

A disc drive includes a stationary frame and vertical spindle shaft, and a hub rotatable relative to the spindle shaft and supporting one or more magnetic discs. A motor for rotating the hub includes an annular stator integrally secured to the spindle shaft, and a rotor assembly integral with the hub. The rotor assembly includes an annular magnet and an annular back iron, with the magnet being spaced apart from the stator to define an air gap. The magnet includes four longitudinally disposed arcuate poles of equal size, separated from one another by flux gaps. Each of the poles has a medial region and first and second end regions on opposite sides of the medial region. The medial region is selectively magnetized to a level less than the level to which the end regions are magnetized, creating a flux gap and torque profile for the magnet particularly effective in reducing torque ripple.

18 Claims, 3 Drawing Sheets

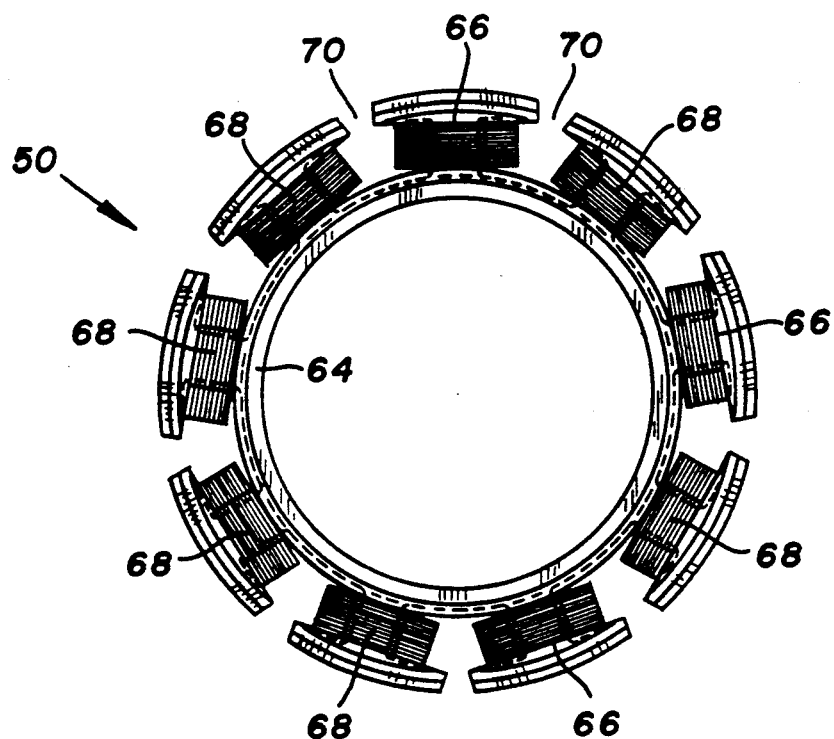
FIG. 2
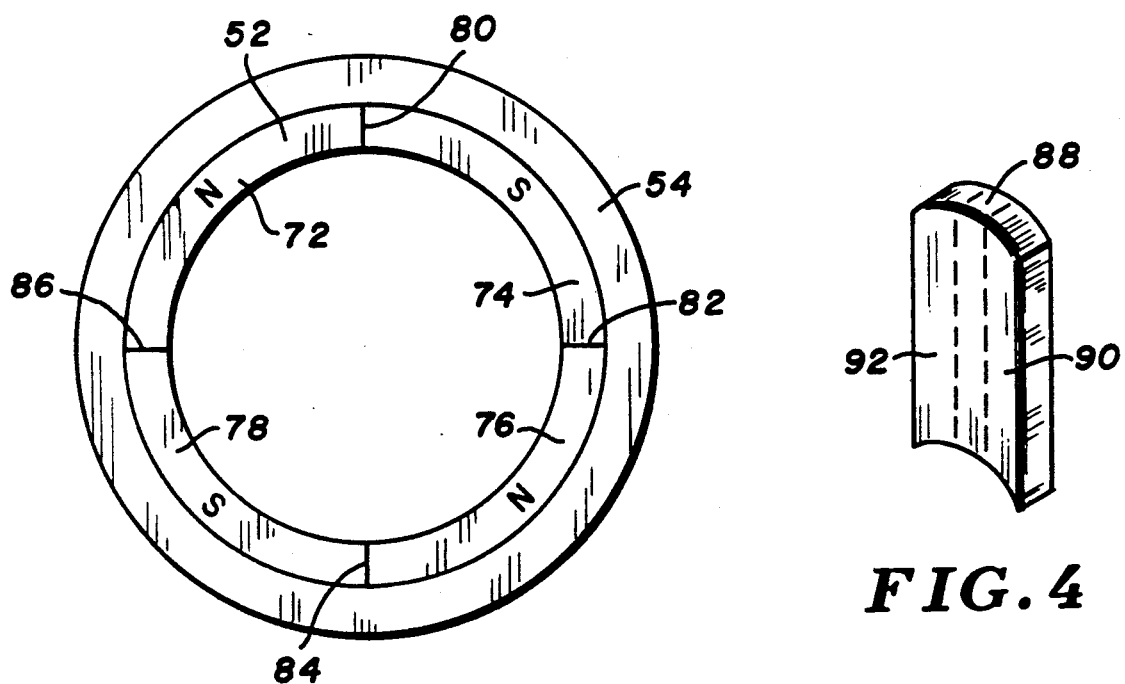
FIG. 3
FIG. 4

SPINDLE MOTOR HAVING REDUCED TORQUE RIPPLE

This is a continuation of copending application Ser. No. 07/452,625, filed on Dec. 15, 1989, now abandoned.

BACKGROUND OF THE INVENTION

The present invention relates to electrical motors, and more particularly to spindle motors used to controllably rotate discs in the course of storing data on the discs or retrieving previously stored data from the discs.

Disc drives, in which one or more discs are supported to rotate on a spindle, are frequently employed in connection with storing magnetic data. Typically a magnetic transducing head is movable radially of the disc which, in combination with disc rotation, permits a selective positioning of the transducing head with respect to the recording surface of the disc. Similarly in connection with optical recording, a laser beam is movable generally radially of a rotating disc for writing information onto the disc, or for reading previously written information. In either case, satisfactory operation of the disc drive depends upon rapidly and smoothly accelerating the hub and discs to a desired rotational speed, maintaining the desired speed, then decelerating when it is desired to stop the discs. To this end, the spindle motor should have a high starting torque, and further should have minimal variance in torque from one angular location to another, i.e. a minimum torque ripple.

It is known that torque ripple effects can be reduced by introducing either radial or longitudinal asymmetry into the magnet of the spindle motor. For example, small magnet may be mechanically coupled or bonded to primary magnets with opposite poles of the respective magnets adjacent one another. Material can be cut away or otherwise removed from an originally symmetrical magnet to produce selective asymmetrical features. Yet another approach is to use non-functioning magnetic material to shunt magnetic flux away from the coils of the spindle motor stator. The current provided through various coils in the stator or rotor may be intermittently switched or otherwise varied, introducing fluctuations in the magnetic field intended to counteract torque ripple. These approaches, however, reduce the efficiency of the magnet and/or stator and thus degrade performance of the spindle motor. Further, they add to the expense of the motor in terms of added materials or cost of assembly.

Therefore, it is an object of the present invention to provide a spindle motor in which torque ripple is reduced without requiring either radial or longitudinal asymmetry in either the rotor or stator structures.

Another object is to provide a spindle motor in which an annular magnet is selectively magnetized to provide magnetic flux pattern across an air gap between the magnet and stator, particularly suited to reduce torque ripple.

SUMMARY OF THE INVENTION

To achieve these and other objects, there is provided a disc drive including a stationary frame, and an elongate spindle shaft fixed with respect to the frame. The spindle shaft extends longitudinally and is centered on a longitudinal spindle axis. The disc drive further includes a hub and at least one disc fixed with respect to the hub, along with a means for mounting the hub to rotate relative to the spindle shaft and about the spindle axis. A spindle motor is provided for rotating the hub. The motor includes an annular, longitudinally disposed stator integral with and concentric with the spindle shaft, and a rotor assembly integral with the hub. The rotor assembly includes an annular, longitudinally disposed magnet spaced apart from the stator to define an annular air gap between the stator and magnet. The magnet includes a plurality of arcuate and longitudinally disposed poles substantially identical to one another in size and shape. Adjacent poles are separated by longitudinally extended flux gaps. Each of the poles includes a longitudinally extending medial region, and first and second longitudinal end regions on opposite sides of the medial region. Each of the poles is selectively magnetized to provide a first magnetic flux level from the medial region across the air gap, and a second magnetic flux level, greater than the first level, from each of the end regions across the air gap.

Preferably the end regions of each pole are charged to saturation, with the medial region charged to a level less than saturation, for example seventy-five to ninety-five percent saturation or, more preferably, about eighty-five percent saturation. This results in a magnetic flux pattern, associated with each pole, in which the peak flux is no longer at the center of the pole. Rather, the center is characterized by a slight dip in flux, between substantially equal peaks on opposite sides of the center. The result of this pattern is a torque ripple that is substantially reduced in terms of peak-to-peak amplitude.

A salient feature of the present invention is that torque ripple is reduced without requiring either a longitudinal or radial asymmetry in the stator or rotor assembly. Accordingly, the stator core, rotor magnet and back iron can be symmetrical, annular members, reducing the cost of their manufacture. The stator can be fabricated without non-productive areas within its volume, thereby enhancing spindle motor efficiency. Thus, in a particularly preferred embodiment of the invention, the magnet, back iron and spindle are annular and symmetrical, radially and longitudinally. Finally, torque ripple is reduced without complex coil switching.

IN THE DRAWINGS

For a further understanding of these and other features and advantages, reference is made to the following detailed description and to the drawings, in which:

FIG. 2 is a top view of a stator employed in a spindle motor of the drive in FIG. 1;

FIG. 3 is a top view of a magnet used in the spindle motor;

FIG. 4 is a perspective view of one of the poles of the magnet;

DETAILED DESCRIPTION OF THE PREFERRED EMBODIMENT

Figure 1:
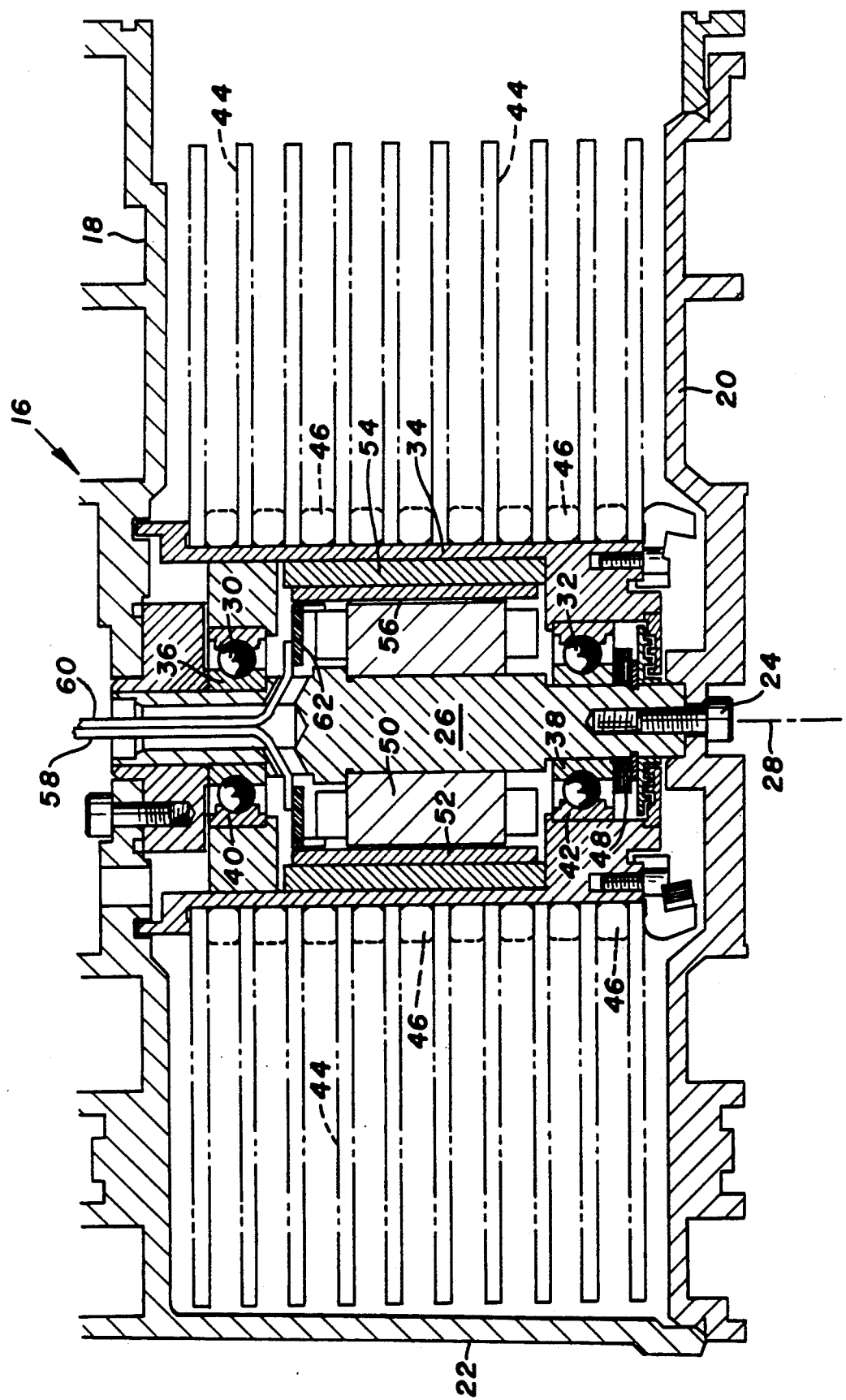
FIG. 1 is a partial sectional view of a disc drive constructed in accordance with the present invention.

Turning now to the drawings, there is shown in FIG. 1 a portion of a magnetic disc drive 16. The drive includes a stationary and rigid frame including a top cover 18, a bottom cover 20 and a side wall 22, constructed for example of aluminum. A fastener 24 secures an elongate spindle shaft 26 to bottom cover 20. Spindle shaft 26 is disposed longitudinally, or vertically as viewed in the figure. Spindle 26 is concentric on a vertical spindle axis 28.

An upper ball bearing 30 and a lower ball bearing 32 are provided for mounting an annular hub 34 to rotate relative to spindle shaft 26, about spindle axis 28. More particularly, inner races 36 and 38 of bearings 30 and 32, respectively, are integral with the spindle shaft, while respective outer races 40 and 42 are integral with hub 34. Hub 34 supports a plurality of horizontally disposed magnetic recording discs 44, separated from one another by a plurality of annular spacers 46. The discs are integral with hub 34, and thus rotate when the hub rotates. Springs at 48 surround spindle shaft 26 and provide a selected preload onto bearings 30 and 32.

An electric spindle motor is provided for rotating discs 44 and hub 34 relative to the spindle shaft. The motor includes a stator 50 integrally secured to spindle shaft 26, and a rotor assembly including an annular magnet 52 and an annular back iron 54, both integrally secured to the hub. Stator 50 and magnet 52 are spaced apart from one another to define a predetermined annular air gap 56. Current to drive the spindle motor is provided over lead wires 58 and 60 to a printed circuit board 62 integral with the stator, and then to the stator.

As seen in FIG. 2, stator 50 includes an annular core 64 having nine radially outward projections 66 equally spaced apart from one another. A version in which the core has twelve such projections has been found particularly suitable. A coil winding 68 is formed about each of projections 66, with gaps 70 provided between adjacent projections and windings. The projections are substantially identical in size and shape, and equally spaced apart angularly from one another, to provide a stator which is symmetrical in the longitudinal and radial directions.

Magnet 52 is shown in greater detail in FIG. 3. The magnet includes four arcuate poles 72, 74, 76 and 78, substantially identical in size and shape, in an alternating N-pole and S-pole configuration. Between the poles are radially and longitudinally directed flux gaps 80, 82, 84 and 86. Back iron 54 is annular, constructed of low carbon steel, and has its radially inward surface contiguous with the radially outward surface of magnet 52. Like the stator, magnet 52 and back iron 54 are symmetrical radially and longitudinally.

In certain respects magnet 52 is formed in a conventional manner. A magnetizable powder is pressed and heated to form the desired arc segment, and a coil is wrapped about the magnet and conducts electrical current sufficiently high to magnetize the annular body toward saturation. However, in accordance with the present invention, each pole piece is not magnetized throughout to saturation. Rather, each of poles 72, 74, 76 and 78 is selectively magnetized to provide a medial region magnetized to a level less than saturation.

As seen in FIG. 4, pole 72 is selectively magnetized to provide three longitudinally extending regions of different magnetization, a medial region 88 and end regions 90 and 92 are on opposite sides of the medial region. More particularly, end regions 90 and 92 are magnetized to full saturation, while medial region 88 is magnetized to a level less than saturation, for example in the range of seventy-five to ninety-five percent, or more preferably to within the range of eighty-five to ninety percent saturation. One such magnet of this type is available from International Magnaproducts, Inc. of Valparaiso, Ind. (as Part No. 618997).

Figure 5:
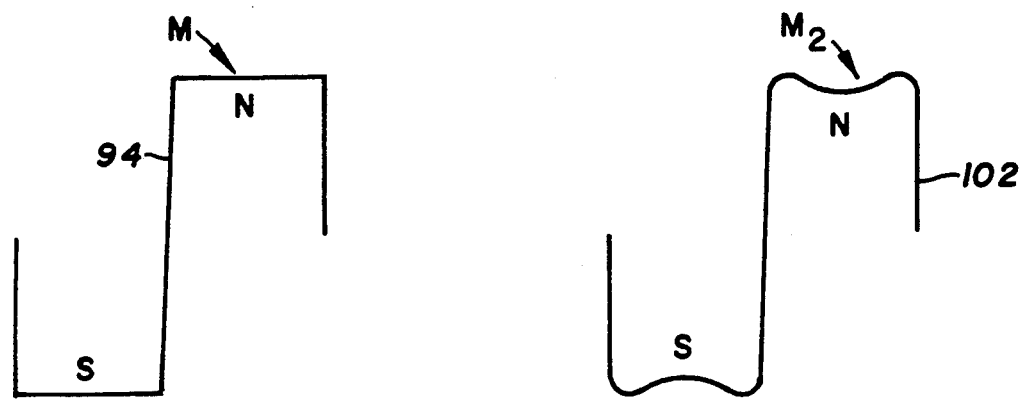
FIG. 5 is a plot of the gap flux, torque profile and resultant torque for a conventional spindle motor.
Figure 6:
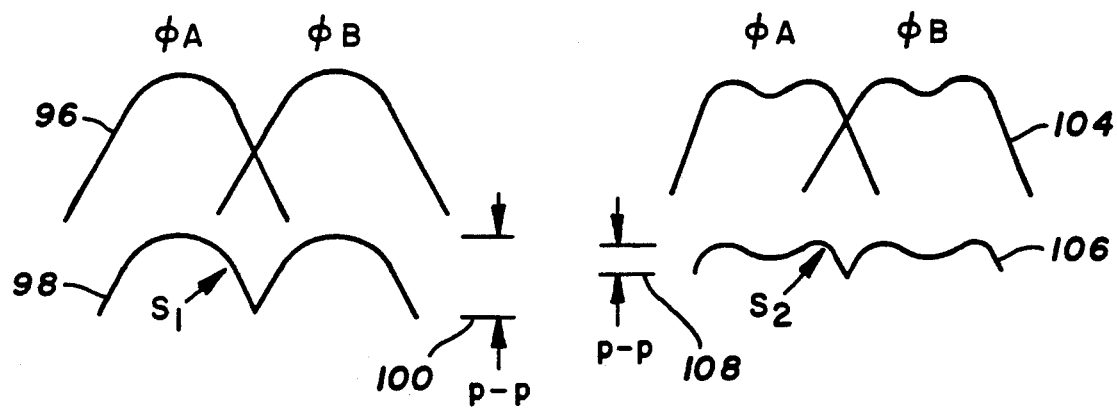
FIG. 6 is a plot of the corresponding gap flux, torque profile and resultant torque of the spindle motor of the drive in FIG. 1.

The advantage of employing magnet 52 in the spindle motor can be appreciated from consideration of FIGS. 5 and 6. FIG. 5 illustrates a gap flux 94, torque profile 96 and resultant torque 98 for an annular spindle motor magnet magnetized conventionally, i.e. at or nearly at one hundred percent saturation throughout the magnet body. The torque profile exhibits peaks corresponding to the center of medial region of each pole. While only two adjacent poles are plotted, it is to be appreciated that further adjacent poles would repeat the pattern illustrated. The resultant torque involves a substantial peak-to-peak gap indicated at 100.

By contrast, FIG. 6 illustrates a gap flux 102 corresponding to magnet 52, in which there is a slight reduction at the medial region of each pole, in each case to about eighty-five to ninety percent of the flux level at the end regions on opposite sides of the medial region. There is a corresponding reduction in the torque profile 104 and resultant torque 106 which, as seen at 108, results in a reduction in peak-to-peak amplitude, for substantially reduced torque ripple.

Thus, in accordance with the present invention, torque ripple is minimized without the added cost of asymmetrical magnets or stators, and further without any complex scheme of current switching among stator or rotor coils. Thus the cost of assembling the spindle motor is reduced while its efficiency is enhanced.

What is claimed is:

1. A spindle motor for a disc drive, said disc drive including a stationary frame; an elongate spindle shaft fixed with respect to the frame, extending in a longitudinal direction and centered on a longitudinal spindle axis; a hub; at least one disc fixed with respect to the hub; and a means for mounting the hub to rotate relative to the spindle shaft and about the spindle axis; said spindle motor including:

an annular longitudinally disposed stator integral with and concentric with the spindle shaft, and a rotor assembly integral with the hub, said rotor assembly including a longitudinally disposed annular magnet concentric with the spindle shaft, substantially centered with respect to the stator in the longitudinal direction, spaced apart from the stator to define an annular air gap, and having a longitudinal length greater than a longitudinal length of the stator whereby the length of the stator determines the length of the air gap; and wherein said magnet is longitudinally and radially symmetrical and includes a plurality of arcuate and longitudinally disposed poles substantially identical to one another in size and shape, adjacent ones of the poles being separated from one another by longitudinal and radial flux gaps running the length of the magnet, each of the poles having a longitudinally extending medial region and first and second longitudinally extending end regions on opposite sides of the medial region, each of the medial region and end regions spanning the entire length of the air gap, each of the poles further being selectively magnetized to provide a first magnetic flux level from the medial region across the air gap, and a second magnetic flux level, greater than the first level, from each of the end regions across the air gap.

2. The spindle motor of claim 1 wherein:

said stator is longitudinally and radially symmetrical.

3. The spindle motor of claim 2 wherein:
said rotor assembly further includes an annular back iron secured between the magnet and the hub and having a radially inward surface contiguous with a radially outward surface of the magnet, said back iron being longitudinally and radially symmetrical.

4. The spindle motor of claim 1 wherein:
said medial region of each pole is magnetized to a selected level less than saturation, and said first and second end regions are magnetized to saturation.

5. The spindle motor of claim 4 wherein:
said magnet includes four of said poles.

6. The spindle motor of claim 4 wherein:
said medial region of each pole is magnetized to a level within the range of from about 75 percent to about 95 percent saturation.

7. The spindle motor of claim 6 wherein:
said medial region of each pole is magnetized to a level within the range of from about 85 percent to about 90 percent saturation.

8. The spindle motor of claim 1 wherein:
each of the longitudinally extending medial region and longitudinally extending end regions spans the entire longitudinal length of said magnet.

9. A spindle motor for a disc drive, said disc drive including a stationary frame; an elongate spindle shaft fixed with respect to the frame, extending in a longitudinal direction and centered on a longitudinal spindle axis; a hub; at least one disc fixed with respect to the hub; and a means for mounting the hub to rotate relative to the spindle shaft and about the spindle axis; said spindle motor including:
an annular longitudinally disposed stator integral with and concentric with the spindle shaft, and a rotor assembly integral with the hub, said rotor assembly including a longitudinally disposed annular magnet concentric with the spindle shaft, spaced apart from the stator to define an annular air gap, and having a longitudinal length at least as great as a longitudinal length of the stator whereby the length of the stator determines the length of the air gap; and
wherein said magnet is longitudinally and radially symmetrical and includes a plurality of arcuate and longitudinally disposed poles substantially identical to one another in size and shape, adjacent ones of the poles being separated from one another by longitudinal and radial flux gaps running the length of the magnet, each of the poles having a longitudinally extending medial region and first and second longitudinally extending end regions on opposite sides of the medial region, each of the medial region and end regions spanning the entire length of the air gap, each of the poles further being selectively magnetized to provide a first magnetic flux level from the medial region across the air gap, and a second magnetic flux level, greater than the first level, from each of the end regions across the air gap.

10. The spindle motor of claim 9 wherein:
said rotor assembly further includes an annular back iron secured between the magnet and the hub and having a radially inward surface contiguous with a radially outward surface of the magnet, said back iron being longitudinally and radially symmetrical.

11. The spindle motor of claim 9 wherein:
said medial region of each pole is magnetized to a selected level less than saturation, and said first and second end regions are magnetized to saturation.

12. The spindle motor of claim 11 wherein:
said medial region of each pole is magnetized to a level within the range of from about 75 percent to about 95 percent saturation.

13. The spindle motor of claim 9 wherein:
each of the longitudinally extending medial region and longitudinally extending end regions spans the entire longitudinal length of said magnet.

14. A spindle motor for a disc drive, said disc drive including a stationary frame, at least one disc, and a means for mounting the disc to rotate relative to the frame and about a longitudinal spindle axis; said spindle motor including:
an annular longitudinally disposed stator integral with the frame and centered on the spindle axis, and a rotor assembly integral with the disc, said rotor assembly including a longitudinally disposed annular magnet centered on the spindle axis, spaced apart from the stator to define an annular air gap, and having a longitudinal length at least as great as a longitudinal length of the stator whereby the length of the stator determines the length of the air gap; and
wherein said magnet is longitudinally and radially symmetrical and includes a plurality of arcuate and longitudinally disposed poles, adjacent ones of the poles being separated from one another by longitudinal and radial flux gaps running the length of the magnet, each of the poles having a longitudinally extending medial region and first and second longitudinally extending end regions on opposite sides of the medial region, each of the medial region and end regions spanning the entire length of the air gap, each of the poles further being selectively magnetized to provide a first magnetic flux level from the medial region across the air gap, and a second magnetic flux level, greater than the first level, from each of the end regions across the air gap.

15. The spindle motor of claim 14 wherein:
said magnet includes four of said poles.

16. The spindle motor of claim 15 wherein:
said medial region of each pole is magnetized to a level within the range of from about 75 percent to about 95 percent saturation.

17. The spindle motor of claim 14 wherein:
each of the longitudinally extending medial region and longitudinally extending end regions spans the entire longitudinal length of said magnet.

18. The spindle motor of claim 14 wherein:
said medial region of each pole is magnetized to a selected level less than saturation, and said first and second end regions are magnetized to saturation.

* * * * *